United States Patent Office 3,049,119
Patented Aug. 14, 1962

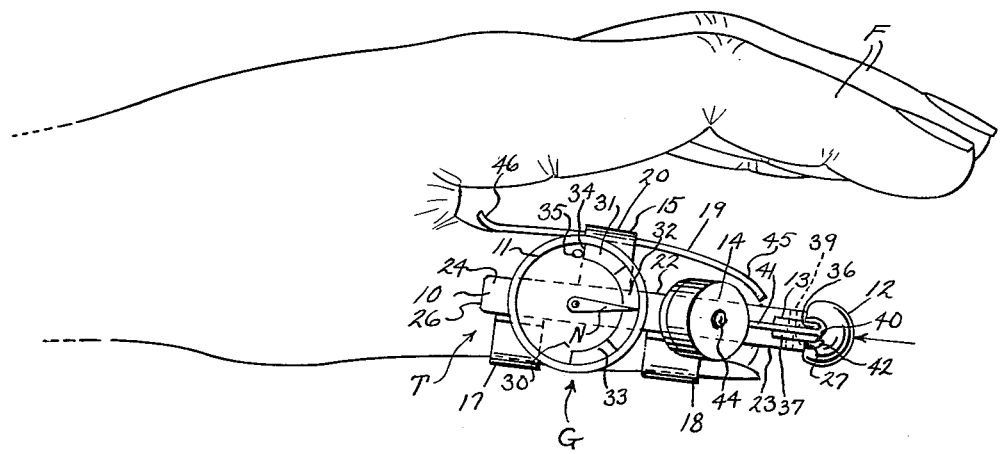

3,049,119
SUBLUXATION GAUGE FOR CHIROPRACTIC USE
Irving N. Tofiness, Cumberland, Wis.
Filed Aug. 15, 1960, Ser. No. 49,724
2 Claims. (Cl. 128—69)

This invention appertains to measuring and testing instruments and more particularly to a novel subluxation gauge for chiropractic use.

A very important part of chiropractic work includes manipulation and adjustment of the human spine by bringing about a slight change in the position of a vertebra or a group of vertebrae. This adjustment takes time and skill to bring about, therefore case records must be kept and just the right amount of pressure must be exerted. Heretofore, to my knowledge, the judgment of the proper pressure has been largely up to and dependent upon the skill and judgment of the manipulator. There has long been a need for some type of instrument that will accurately indicate and measure the exact force necessary for the proper adjustment of a vertebra in each individual case and allowing consistent force to be exerted with relative ease.

It is therefore a primary object of my present invention to provide a novel instrument or gauge of the above character that can be conveniently fitted to the thumb to indicate the exact amount of pressure or force being applied to any vertebra in the human spine.

Another important object of my present invention is to provide a subluxation gauge which will enable the manipulator to not only quickly ascertain the exact force necessary but also to maintain a consistent force as desired.

A further object of my present invention is to aid the manipulator in recording the necessary force to make a slight change in the position of a vertebra so that in each treatment the same force can be applied to a given individual and which force, of course, depends in each individual case upon the contraction of muscles and ligaments and connective tissues involved.

Still another object of my present invention is to provide a novel gauge which may be used to normalize the position of a subluxated vertebra.

A salient feature of my novel gauge resides in the fact that it can be held in the hand or slipped onto the thumb and force applied at various angles and directions to any other vertebra in the spine and a record kept relative to angles, directions and pressures used, provision being made so that the angle of the probe in relation to the position of the instrument on the thumb can be accurately measured and readily ascertained.

A more specific object of my present invention relates to providing a subluxation gauge having a body portion carrying a gauge or dial for measuring force, a probe in the forward portion of the gauge to which the gauge is responsive, a level for indicating the proper angle of use of the gauge and novel means for firmly holding the instrument on the thumb.

A further object of my invention is to provide a simple, practical and reliable construction that is relatively economical to manufacture, easy to assemble, and positive in its operation.

With these and other objects in view and to the end of attaining any other advantages hereinafter appearing, this invention consists in the construction, combination and arrangements of parts hereinafter described, pointed out in the claims and illustrated in the accompanying drawings.

In said drawings,

FIGURE 1 is a perspective view showing my novel instrument fitted on the thumb of the hand of an individual, the dial indicating a certain pressure or force being applied;

FIGURE 2 is a side elevational view of my novel instrument, certain parts being broken away and in section to illustrate further details in the construction;

FIGURE 3 is a rear elevational view of my novel instrument shown removed from the thumb; and FIGURE 4 is a horizontal section taken on the line 4—4 of FIGURE 2 of the drawings, looking in the direction of the arrows.

Referring now to the drawings in detail wherein similar reference characters designate corresponding parts throughout the several views, the letter G generally indicates my novel instrument and the same includes broadly, a longitudinally extending body portion 10, a gauge or dial 11, a probe 12 mounted on one end of a bell crank mechanism 13, a level 14 and means 15 for holding the instrument on the thumb T.

Attention is now directed to FIGURE 1 of the drawings and it can be seen that the instrument G is fitted on the thumb T in the position shown in relation to the fingers F. In other words, the instrument sits on the upper side of the thumb with the joint of the thumb being positioned between the rigid formed plates 17 and 18 respectively and these rigid plates are shaped to conform to the outside of the thumb and cooperate with a formed longitudinally extending inner plate 19 which conforms to the inside surface of the thumb. Plate 19 of course is firmly secured to a U-shaped spring clamp unit 20, better shown in FIGURE 3 of the drawings. The U-shaped spring clamp 20 has one leg 21 riveted to the side 22 of the body 10 and of course each one of the formed rigid plates 17 and 18 are riveted or otherwise secured to the side 23 of the body 10 in the position shown. The body 10 can be made of any desired material but preferably is of a light material, substantially rectangular in shape to provide a top surface 24, a lower bottom surface 25, sides 22 and 23, a back wall 26 and an open front end 27. The inner portion of the body 10 is preferably hollow as shown to provide the compartment 28 indicated clearly in FIGURES 2 and 4 of the drawings.

Mounted on the upper surface of the body 10 is the dial or gauge 11 and this dial or gauge may be of any standard construction but in the preferred form it is of a high-precision type and includes the depending worm 29 which extends into the compartment 28 adjacent the rear portion thereof. The face 30 of the dial can be calibrated in any desired way to indicate the amount of force being applied or, as shown in FIGURE 1 of the drawings, different areas 31, 32 and 33 may be provided to give an accurate indication of the force applied to the vertebra, the needle N being shown in a position registering a certain amount of force, the zero position being indicated by the numeral 34. The needle N can be stopped at zero by utilizing a pin 35 as shown or any means may be utilized to keep the needle from going back past the zero indication. The needle, of course, indicates in direct response to the turn of the worm 29 as is well-known in such instruments. Pivotally secured at the forward end 27 of the body 10 is the probe 12. This probe is positioned at the lower end of the leg 36 and leg 37 extends inwardly and is provided with the gear teeth arrangement 38 to give in effect a bell crank arrangement, and obviously any pressure in the direction of the arrows (FIGURES 1 and 2) on the probe 12 will cause the worm to rotate in direct response thereto, since leg 37 will tend to move upwardly about the pivot pin 39. To return the probe to its proper position after pressure or force has been released, I provide a wire spring 40 and this spring has one end 41 anchored to the upper surface of the body 10 and has its hooked-shaped lower end 42 trained about the leg 36 to exert force in a direction opposite from the force indicated by the arrows on the probe 12 of FIGURES 1 and 2.

As previously brought out, this instrument must be utilized at the proper angle and in this way not only aids in keeping a consistent force, but also aids in determining the proper angle of force or contact opposite the apex of the sacrum or on any vertebra of the human spine. To aid in determining the proper angle, I mount the level 14 to the top surface 24 of the body 10 by means of the bracket 43. This bracket may be mounted at any desired known angle, but preferably, I utilize an angle of 40 degrees and the instrument is then constructed so as to be positioned on the thumb in such a way that a force exerted when the level bubble 44 is centered will be exerted at the proper angle. The proper position of the instrument is clearly shown by FIGURE 1 of the drawings and also the position of the thumb is indicated by dotted lines in FIGURE 2 of the drawings and the instrument fits on the upper surface of the thumb, with the brackets 17 and 18 on either side of the thumb joint. The plate 19, as previously stated, is shaped to conform to the inside surface of the thumb and lies in a horizontal position and has its outer end 45 curved as clearly shown in FIGURES 1 and 4 of the drawings. The inner end 46 is curved sharply inward to conform to the contour of the rear portion of the thumb and inasmuch as the plates 17, 18 and 19 are rigid, but the U-shaped clamp 20 is of spring material, it can be seen that when the instrument is slipped on the thumb, it will be held firmly thereon. Obviously, I could utilize other means for holding the instrument to the thumb, such as U-shaped spring clips or the like, on either side of the body 10, but I prefer to utilize the means shown and described.

From the foregoing, it can be seen that I have provided a novel instrument or subluxation gauge which has tremendous advantages for chiropractic use in that it not only will record the force or pressure being exerted but will aid in keeping a consistent force, will indicate the proper angle necessary for applying the force and will materially aid in keeping records of work done and therefore assists measurably, not only in actually adjusting the vertebrae, but in teaching and showing others how to adjust and apply the proper force necessary for normalizing the position of a subluxated vertebra and therefore, while I have shown and described certain specific embodiments of my invention, it will be understood that these embodiments are merely for the purpose of illustration and description, that various other forms may be devised, and that changes may be made in the proportion and minor details of construction without departing from the spirit of the invention or the scope of the appended claims.

What I claim as new is:

1. An instrument adapted to be held on the thumb of the hand for indicating force and pressure applied to a surface as well as indicating the angle of application comprising, a substantially rectangular-shaped longitudinally extending body having top, bottom, side and end walls, said body having a substantially hollow interior, an indicating needle dial mechanism mounted on said top wall, a depending worm shaft extending into said hollow interior and mounted for rotation with respect to said body, said worm shaft being in operative connection with said indicating needle, a depending probe pivotedly secured to the forward end of said body, an inwardly extending leg secured at one end to said probe, gear teeth on the other end of said leg operatively connected to said worm shaft, whereby pressure on said probe in one direction will cause said needle to move across said dial, a wire spring mounted on said probe and said body exerting force on said probe in a direction opposite of said pressure force, a pair of rigid spaced plates secured to one side of said body, said plates conforming to the shape of the outside of the thumb and adapted to receive the thumb joint therebetween, a longitudinally extending plate conforming to the shape of the inside of the thumb, a depending spring clamp secured to said body and to said longitudinally extending plate on the side opposite from rigid depending plates, and a level mounted at a known angle to the upper wall of said body adjacent said needle dial mechanism.

2. An analyzation instrument adapted to be held on the thumb of the hand for indicating force and pressure applied to a surface comprising, a substantially rectangular-shaped longitudinally extending body having top, bottom, side and end walls, said body having a substantially hollow interior, an indicating needle dial mechanism mounted on said top wall, a depending worm shaft extending into said hollow interior and mounted for rotation with respect to said body, said worm shaft being in operative connection with said indicating needle, a depending probe pivotally secured to the forward end of said body, said probe extending downwardly and forwardly of said body, an inwardly extending leg secured at one end to said probe, gear teeth on the other end of said leg operatively connected to said worm shaft, whereby pressure on said probe in one direction will cause said needle to move across said dial, a wire spring mounted on said probe and said body exerting force on said probe in a direction opposite of said pressure force, a pair of rigid spaced plates secured to one side of said body, said plates conforming to the shape of the outside of the thumb and adapted to receive the thumb joint therebetween, a longitudinally extending plate conforming to the shape of the inside of the thumb, and a depending spring clamp secured to said body and to said longitudinally extending plate on the side opposite from rigid depending plates.

References Cited in the file of this patent

UNITED STATES PATENTS

| | | |
|---|---|---|
| 2,078,159 | Redding | Apr. 20, 1937 |
| 2,898,686 | Croshier | Aug. 11, 1959 |